US012682750B2

(12) United States Patent
Aminaka et al.

(10) Patent No.: US 12,682,750 B2
(45) Date of Patent: Jul. 14, 2026

(54) TRAFFIC CONTROL APPARATUS, SYSTEM, METHOD, AND COMPUTER READABLE MEDIUM

(71) Applicant: NEC Corporation, Tokyo (JP)

(72) Inventors: Hiroaki Aminaka, Tokyo (JP); Tetsuro Hasegawa, Tokyo (JP); Kosei Kobayashi, Tokyo (JP); Kei Yanagisawa, Tokyo (JP); Kazuki Ogata, Tokyo (JP)

(73) Assignee: NEC CORPORATION, Tokyo (JP)

( * ) Notice: Subject to any disclaimer, the term of this patent is extended or adjusted under 35 U.S.C. 154(b) by 303 days.

(21) Appl. No.: 18/559,387

(22) PCT Filed: May 14, 2021

(86) PCT No.: PCT/JP2021/018468
§ 371 (c)(1),
(2) Date: Nov. 7, 2023

(87) PCT Pub. No.: WO2022/239241
PCT Pub. Date: Nov. 17, 2022

(65) Prior Publication Data
US 2024/0242603 A1 Jul. 18, 2024

(51) Int. Cl.
G08G 1/07 (2006.01)
G06V 20/40 (2022.01)
(Continued)

(52) U.S. Cl.
CPC .............. G08G 1/07 (2013.01); G06V 20/44 (2022.01); G06V 20/54 (2022.01); G08G 1/0133 (2013.01); G08G 1/141 (2013.01); G06V 2201/08 (2022.01)

(58) Field of Classification Search
None
See application file for complete search history.

(56) References Cited

U.S. PATENT DOCUMENTS

2010/0289632 A1 * 11/2010 Seder .................... G01S 13/931
382/104
2015/0307108 A1 * 10/2015 Chollet .................... H04N 7/18
348/149
(Continued)

FOREIGN PATENT DOCUMENTS

DE 102006000509 A1 * 6/2008 ............... G08G 1/07
JP 2004-90721 A 3/2004
(Continued)

OTHER PUBLICATIONS

International Search Report for PCT Application No. PCT/JP2021/018468, mailed on Jul. 20, 2021.

*Primary Examiner* — Amandeep Saini
*Assistant Examiner* — Caroline Tabancay Duffy
(74) *Attorney, Agent, or Firm* — Sughrue Mion, PLLC

(57) ABSTRACT

An imaging device can capture a video image of a road on which a moving object travels. In a traffic control apparatus, detection means detects the occurrence of an accident from a video image captured by an imaging device. Determination means determines the situation of the accident that has occurred based on the video image captured by the imaging device. Traffic light control means controls a traffic light installed at the intersection where the accident has occurred based on the determined situation of the accident.

12 Claims, 6 Drawing Sheets

(51) Int. Cl.
   *G06V 20/54*      (2022.01)
   *G08G 1/01*      (2006.01)
   *G08G 1/14*      (2006.01)

(56)            References Cited

U.S. PATENT DOCUMENTS

| | | | | |
|---|---|---|---|---|
| 2018/0122229 A1 * | 5/2018 | Mubarek | ................ | G08G 1/097 |
| 2018/0336781 A1 * | 11/2018 | Jin | ......................... | G06V 20/41 |
| 2019/0333375 A1 * | 10/2019 | Malkes | ................... | G01W 1/10 |

FOREIGN PATENT DOCUMENTS

| | | | |
|---|---|---|---|
| JP | 2006202225 A | * | 8/2006 |
| JP | 2014-63242 A | | 4/2014 |
| JP | 2019-197525 A | | 11/2019 |

\* cited by examiner

TRAFFIC CONTROL APPARATUS, SYSTEM, METHOD, AND COMPUTER READABLE MEDIUM

This application is a National Stage Entry of PCT/JP2021/ 018468 filed on May 14, 2021, the contents of all of which are incorporated herein by reference, in their entirety.

TECHNICAL FIELD

The present disclosure relates to a traffic control apparatus, a system, a method and a computer readable medium.

BACKGROUND ART

In a related art, Patent Literature 1 discloses an emergency notification system. In the emergency notification system, a navigation device installed on a vehicle shows one or more kinds of emergency situations on a screen. When an emergency situation occurs, a user selects an emergency situation corresponding to the emergency situation which has occurred from the displayed emergency situations. When one of the emergency situations is selected, the navigation device connects to a plurality of reporting destinations corresponding to the selected emergency situation through a communication line. The reporting destinations include a local police station, a fire station, an insurance company, a repair shop, and a hospital. The navigation device transmits report data to a plurality of reporting destinations. The report data includes vehicle status data including the current position of the vehicle and the accident status.

In another related art, Patent Literature 2 discloses a moving object information communication device. The moving object information communication device receives traffic light data of a traffic light from a road side unit. When an impact sensor detects an impact, the moving object information communication device stores a video image captured by a camera in a storage unit. At that time, the moving object information communication device identifies the color data of the traffic light based on the traffic light data received from the road side unit, and stores the color data of the traffic light together with the video image in the storage part.

CITATION LIST

Patent Literature

[Patent Literature 1] Japanese Unexamined Patent Application Publication No. 2004-90721
[Patent Literature 2] Japanese Unexamined Patent Application Publication No. 2014-63242

SUMMARY OF INVENTION

Technical Problem

In Patent Literature 1, when a user selects an item of an emergency situation, the navigation device transmits report data to a reporting destination corresponding to the selected emergency situation In this case, the user can automatically transmit report data to the appropriate reporting destination by simply selecting the item closest to the situation in the emergency situation from the screen display However, although the emergency report system disclosed in Patent Literature 1 can automate transmission of report data in response to the emergency situation, it cannot control traffic on the road where the accident has occurred.

In the Patent Literature 2, when an accident occurs, the video image at the time of the accident and the color data of the traffic light at that time are stored in the storage part. In this case, the party who has caused or has been involved in the accident or a third party can easily confirm the lighting condition of the traffic light at the time of the accident. However, Patent Literature 2, like Patent Literature 1, cannot control traffic on the road where the accident has occurred.

In view of the above circumstances, an object of the present disclosure is to provide a traffic control apparatus, a system, a method, and a computer-readable medium capable of controlling traffic on the road where the accident has occurred.

Solution to Problem

To achieve the above objective, the present disclosure provides, as a first aspect, a traffic control apparatus. The traffic control apparatus includes detection means for detecting an occurrence of an accident from a video image captured by an imaging device capable of capturing a video image of a road on which a moving object travels, determination means for determining a situation of the accident based on the video image, and traffic light control means for controlling a first traffic light installed at a first intersection where the accident has occurred based on the situation of the accident.

The present disclosure provides, as a second aspect, a traffic control system. A traffic control system includes an imaging device capable of capturing a video image of a road on which a moving object travels and a traffic control apparatus configured to receive a video image from the imaging device and control passage of the moving object traveling on the road. The traffic control apparatus includes detection means for detecting an occurrence of an accident from the video image captured by the imaging device, determination means for determining a situation of the accident based on the video image, and traffic light control means for controlling a first traffic light installed at a first intersection where the accident has occurred based on the situation of the accident.

The present disclosure provides, as a third aspect, a traffic control method. The traffic control method includes detecting an occurrence of an accident from a video image captured by an imaging device capable of capturing a video image of a road on which a moving object travels, determining a situation of the accident based on the video image, and controlling a traffic light installed at an intersection where the accident has occurred based on the situation of the accident.

The present disclosure provides, as a fourth aspect, a computer-readable medium. A computer readable medium stores a program for causing a computer to perform processes of detecting an occurrence of an accident from a video image captured by an imaging device capable of capturing a video image of a road on which a moving object travels, determining a situation of the accident based on the video image, and controlling a traffic light installed at an intersection where the accident has occurred based on the situation of the accident.

Advantageous Effects of Invention

The traffic control apparatus, the system, the method, and the computer readable medium according to the present disclosure can control traffic on the road where the accident has occurred.

EXAMPLE EMBODIMENT

Figure 1:
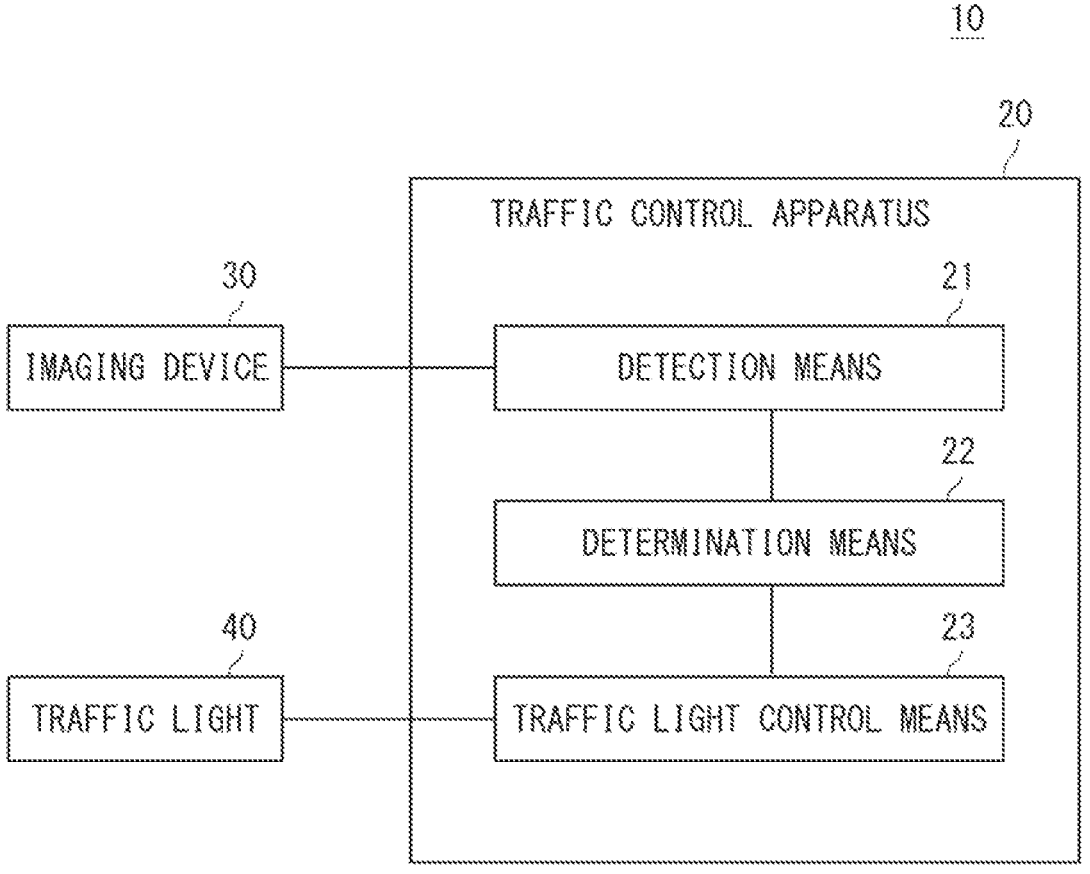
FIG. 1 is a block diagram schematically illustrating a traffic control system in the present disclosure.

Prior to giving the description of an embodiment according to the present disclosure, an outline of the present disclosure will be described. FIG. 1 schematically shows an example of a traffic control system according to the present disclosure. A traffic control system 10 includes a traffic control apparatus 20 and an imaging device 30. The imaging device 30 is an imaging device capable of capturing a video image of a road on which a moving object travels. The traffic control apparatus 20 receives a video image from the imaging device 30 and controls the passage of a moving object traveling on the road.

The traffic control apparatus 20 has detection means 21, determination means 22, and traffic light control means 23. The detection means 21 detects the occurrence of an accident based on the video image captured by the imaging device 30. The determination means 22 determines the situation of the accident that has occurred based on the video image captured by the imaging device 30. The traffic light control means 23 controls a traffic light 40 installed at the intersection where the accident has occurred based on the determined situation of the accident.

In the present disclosure, the detection means 21 detects an occurrence of an accident, and the determination means 22 determines the situation of the accident. The traffic light control means 23 controls the traffic light 40 based on the situation of the accident. The present disclosure can control traffic on the road where the accident occurred by controlling the lighting condition of the traffic light installed at the intersection where the occurrence of the accident is detected. For example, the traffic light control means 23 can turn the traffic light 40 red at the intersection where the accident has occurred. In that case, the traffic control apparatus 20 can prevent the inflow of other moving objects to the intersection where the accident is detected.

Figure 2:
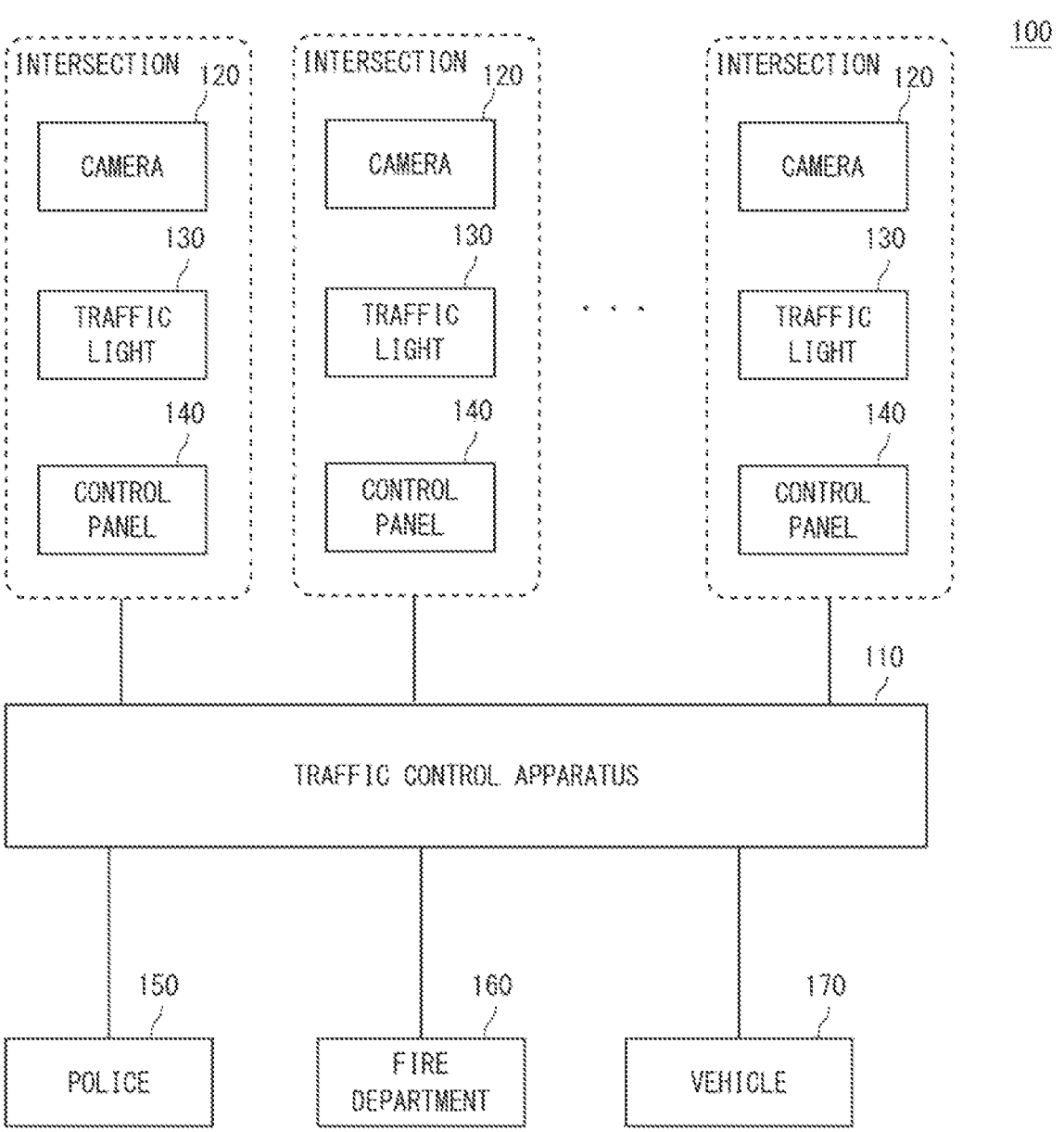
FIG. 2 is a block diagram illustrating a traffic control system according to an example embodiment of the present disclosure.

An example embodiment according to the present disclosure will now be described in detail with reference to the drawings. FIG. 2 shows a traffic control system according to an example embodiment of the present disclosure. A traffic control system 100 according to the example embodiment of the present disclosure includes a traffic control apparatus 110, a camera 120, a traffic light 130, and a control panel 140. In the traffic control system 100, the camera 120, the traffic light 130, and the control panel 140 are arranged, for example, at each of a plurality of intersections. The traffic control system 100 corresponds to the traffic control system 10 shown in FIG. 1.

The camera 120 is an imaging device capable of capturing a video image of an intersection which moving objects travel through and roads on which the moving objects travel in the vicinity. Moving objects traveling on the roads may include, for example, vehicles such as automobiles, buses, special types of vehicles, and two-wheeled vehicles. The camera 120 captures, for example, a vehicle traveling through the intersection. The camera 120 is installed, for example, at a traffic light 130 or other roadway installations. A plurality of cameras 120 may be disposed at one intersection. The camera 120 is connected to a road side unit (RSU), and the video image captured by the camera 120 is transmitted to the traffic control apparatus 110 through a network. The network may include at least one of a wired network and a wireless network. The camera 120 corresponds to the imaging device 30 shown in FIG. 1.

The traffic light 130 controls traffic of vehicles at an intersection. The traffic light 130 has "green," "yellow," and "red" lights. The traffic light 130 may have one or more arrow-shaped signals, such as "a right turn signal," "a left turn signal," and "a go-straight signal." The number of traffic lights 130 disposed at each intersection is not limited to one. A plurality of traffic lights 130 may be disposed at one intersection. The traffic light 130 corresponds to the traffic light 40 shown in FIG. 1.

The control panel 140 controls the lighting condition of the traffic light. Under normal situations, the control panel 140 controls the lighting condition of the traffic light 130 according to a predefined lighting cycle. Although FIG. 2 shows an example in which the control panel 140 is disposed at each intersection, the example embodiment of the present disclosure is not limited thereto. For example, one control panel 140 may be used to control the traffic lights 130 at a plurality of intersections.

The traffic control apparatus 110 receives a video image captured by the camera 120 and controls the passage of moving objects traveling through and near the intersection. The traffic control apparatus 110 performs, for example, video image analysis processing on a video image received from the camera 120. The traffic control apparatus 110 detects the occurrence of an accident at an intersection by, for example, performing video image analysis processing of the video image. The traffic control apparatus 110 determines the situation of the accident. The traffic control apparatus 110 controls the lighting condition of the traffic light 130 through the control panel 140 according to the result of the video image analysis processing, and controls the passage of moving objects at the intersection.

The traffic control apparatus 110 is configured to be able to communicate with organizations concerned (i.e. its servers) such as police 150 and a fire department 160 through the network. Furthermore, the traffic control apparatus 110 is configured to be able to communicate with vehicles (their on-board units) 170 traveling on the road. When an accident occurs, the traffic control apparatus 110 may collect vehicle data from a vehicle 170 that has caused or has been involved in the accident. When an accident occurs, the traffic control apparatus 110 may notify at least one of the police 150, the fire department 160, and a vehicle 170 that has neither directly caused nor been directly involved in the accident about the occurrence of the accident. The notification destination is not limited to the police 150, the fire department 160, and the vehicle 170 mentioned above. The traffic control apparatus 110 may notify other agencies or any company about the occurrence of the accident. The traffic control apparatus 110 corresponds to the traffic control apparatus 20 shown in FIG. 1.

Figure 3:
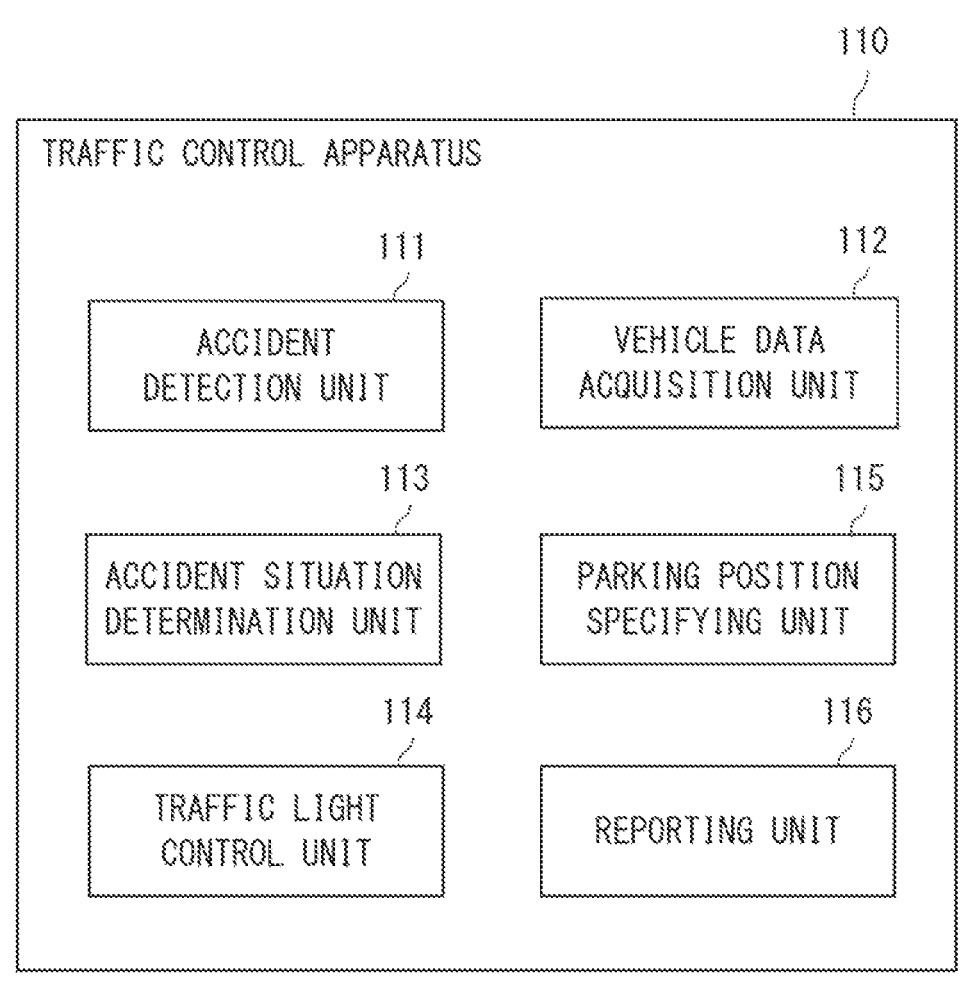
FIG. 3 is a block diagram illustrating an example of a configuration of a traffic control apparatus.

FIG. 3 shows a configuration example of the traffic control apparatus 110. The traffic control apparatus 110 includes an accident detection unit 111, a vehicle data acquisition unit 112, an accident situation determination unit 113, a traffic light control unit 114, a parking position specifying unit 115, and a reporting unit 116. At least a part of a function of each unit in the traffic control apparatus 110 can be carried out by having a computer execute processing according to a program read from a memory.

The accident detection unit 111 detects the occurrence of an accident from the video image received from the camera 120. The accident detection unit 111 performs video image analysis processing on the video image received from the camera 120, for example, to detect the occurrence of an accident. The detected accident may include, for example, vehicle-to-vehicle and vehicle-to-person accidents. The accident detection unit 111 may detect the occurrence of an accident using known video image analysis technology for detecting the occurrence of an accident from a video image. The accident detection unit 111 may detect the occurrence of an accident further using, for example, audio data acquired using a microphone provided in the camera 120. The accident detection unit 111 corresponds to the detection means 21 shown in FIG. 1.

The vehicle data acquisition unit (vehicle data acquisition means) 112 acquires vehicle data from the vehicle 170 that has caused or has been involved in the accident. For example, the vehicle data acquisition unit 112 requests the vehicle 170 to transmit vehicle data including data such as a vehicle speed, an acceleration, and an airbag operation status. Upon receiving the request, the vehicle 170 transmits the vehicle data to the traffic control apparatus 110 through a wireless communication line or the like. The vehicle 170 may detect the occurrence of an accident based on data from an acceleration sensor, an impact sensor, or the like. In this case, when the vehicle 170 detects the occurrence of an accident, the vehicle 170 may automatically transmit the vehicle data to the traffic control apparatus 110.

When the occurrence of an accident is detected, the accident situation determination unit 113 determines the situation of the accident based on the video image received from the camera 120. For example, the accident situation determination unit 113 performs video image analysis processing on the video image received from the camera 120 to determine the situation of the accident. The accident situation determination unit 113 determines, for example, whether or not traveling of vehicles on the road is hampered by the accident. The accident situation determination unit 113 determines that traveling of vehicles on the road is hampered when the vehicle which has caused the accident blocks the lane. Alternatively or additionally, the accident situation determination unit 113 determines that traveling of vehicles on the road is hampered when objects such as luggage are scattered on the road due to the accident.

In addition, the accident situation determination unit 113 may determine at least one of whether or not the accident has caused an injury or a death of a person, whether or not a fire has occurred due to the accident, the scale of the accident, and the condition of the injured person as the situations of the accident. In addition, the accident situation determination unit 113 may determine the situations of the accident by using the vehicle data acquired by the vehicle data acquisition unit 112 in addition to the video image received from the camera 120. The accident situation determination unit 113 may infer that an accident involving injury or death, or a large-scale accident has occurred when, for example, the vehicle speed or the acceleration at the time of the accident is equal to or greater than a threshold value. Alternatively, the accident situation determination unit 113 may infer that a large-scale accident has occurred when an airbag inflated. The accident situation determination unit 113 corresponds to the determination unit 22 shown in FIG. 1.

The traffic light control unit 114 controls the traffic light (first traffic light) 130 installed at the intersection (first intersection) where the accident has occurred based on the situation of the accident determined by the accident situation determination unit 113. The traffic light control unit 114 controls the lighting condition of the traffic light 130 through, for example, the control panel 140. The traffic light control unit 114 may control the lighting condition of the traffic light 130 through, for example, a traffic control center that controls traffic lights at a plurality of intersections. For example, the traffic light control unit 114 turns the light of the traffic light 130 to one indicating that the traffic is not allowed when the accident situation determination unit 113 determines that traveling of vehicles on the road is hampered.

When it is determined that traveling of vehicles on the road is hampered, the traffic light control unit 114 may further control one or more traffic lights (second traffic lights) installed at one or more other intersections (second intersections) from which roads lead to the road where the accident has occurred. In this case, the traffic light control unit 114 may control the light(s) of the second traffic light(s) to prevent traffic flow to the road leading to the first intersection where the accident has occurred among a plurality of roads through which vehicles and the like can flow out of the second intersection. The traffic light control unit 114 corresponds to the traffic light control means 23 shown in FIG. 1.

The reporting unit (reporting means) 116 selects a reporting destination based on the situation of the accident determined by the accident situation determination unit 113, and notifies the selected reporting destination of the occurrence of the accident. The reporting unit 116 selects a reporting destination from, for example, the police 150, the fire department 160, and the surrounding vehicles 170, and notifies the selected reporting destination of the occurrence of the accident. The reporting unit 116 may select a terminal device such as a smartphone possessed by a person near the intersection where the accident has occurred as the reporting destination, and notify the person near the intersection about the occurrence of the accident. In addition to the reporting data, the reporting unit 116 may transmit the video image received from the camera 120 to the reporting destination.

The reporting unit 116 generates reporting data including, for example, the fact that an accident has occurred and the situation of the accident, and transmits the generated reporting data to the reporting destination. The reporting unit 116 may transmit the location data of the intersection where the accident has been detected to the reporting destination. In the police 150 and the fire department 160, an operator can confirm the situation of the accident and the location of the intersection where the accident has been detected, and arrange for an emergency vehicle. When reporting data is transmitted to the vehicle 170, the vehicle 170 may use an on-board navigation device to notify the driver of the location of the intersection where the accident has been detected. The navigation device may also search for a route to bypass the intersection where the accident has been detected and show the bypass route to the driver. In addition, the reporting unit 116 may transmit the reporting data to an information display board installed on the road. In this case, the information display board may indicate the situation of the accident and the location of the intersection where the accident has been detected, and notify drivers of the information of the occurrence of the accident.

For example, the reporting unit 116 may select a reporting destination according to at least one of the determination results of whether or not the accident is an accident involving injury or death, whether or not there is a fire caused due to the accident, the scale of the accident, and the condition of an injured person. The reporting unit 116 may select a reporting destination according to the accident situation, for example, by using a table that defines combinations of various items of accident situations and correspondence relationships with reporting destinations. Furthermore, the reporting unit 116 may select a reporting destination according to the accident situation and according to a predefined rule. Alternatively, the reporting unit 116 may select a reporting destination by using an artificial intelligence (AI) model in which the accident situation is input and the reporting destination is output.

When the occurrence of an accident is detected by the accident detection unit 111, the parking position specifying unit (parking position specifying means) 115 specifies an available parking position for a vehicle, such as an emergency vehicle which is dispatched upon receiving the notification of the occurrence of an accident, based on the video image received from the camera 120. The emergency vehicle includes, for example, a police vehicle, a fire engine, and an ambulance. The parking position specifying unit 115 finds a space on the road where the emergency vehicle can be parked, for example, from the video image, and specifies the space as an available parking position. The reporting unit 116 notifies the reporting destination of the specified available parking position. The reporting unit 116 indicates, for example, the available parking position in the video image of the camera 120 to be transmitted to the reporting destination. Alternatively, the reporting unit 116 may transmit position data (latitude and longitude) indicating the available parking position to the reporting destination. The emergency vehicle displays the point corresponding to the received position data on the display screen of a device such as a navigation device.

Figure 4:
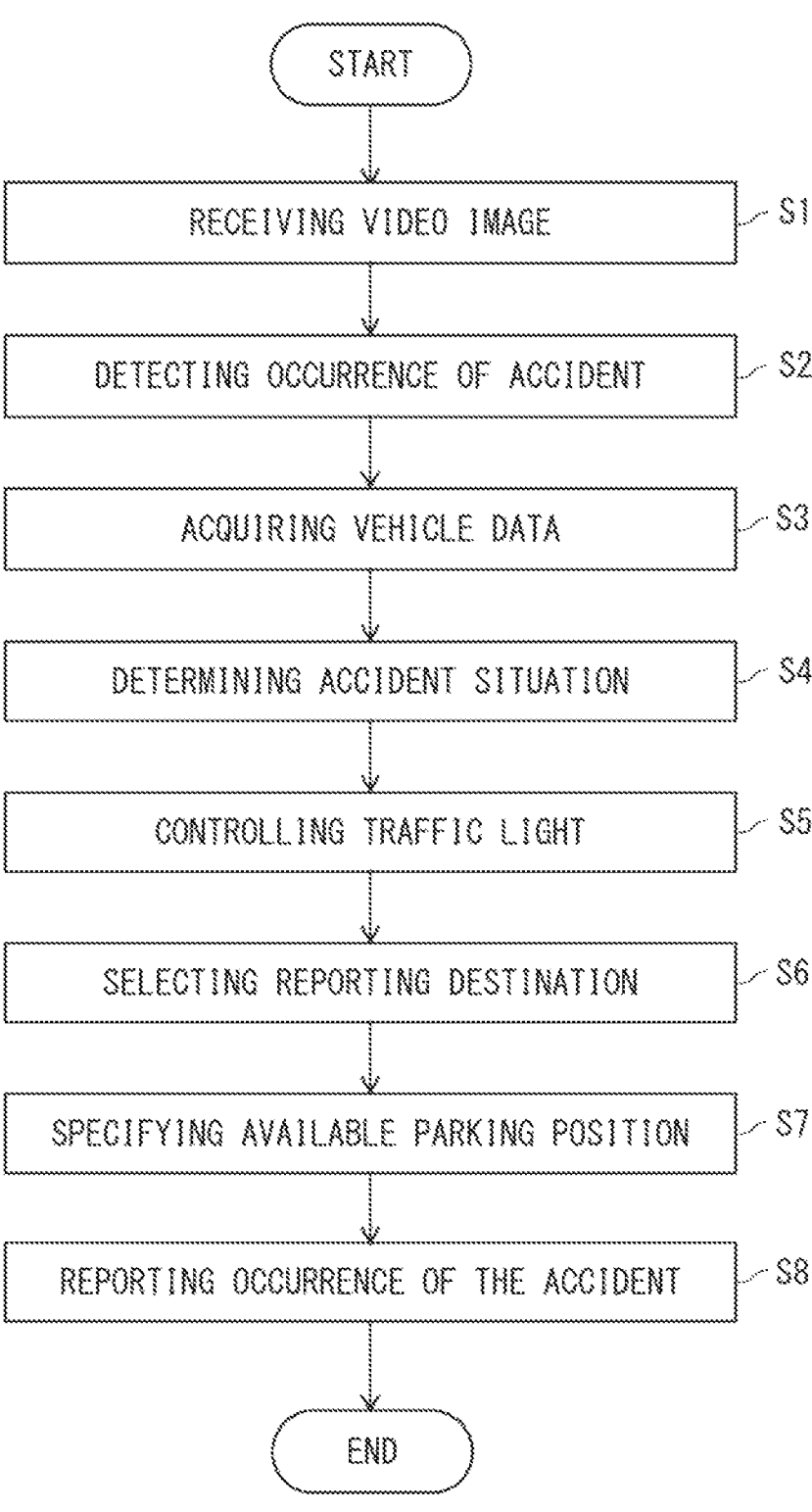
FIG. 4 is a flowchart illustrating an operation procedure.

Next, the operation procedure will be described. FIG. 4 shows an operation procedure (traffic control method) in the traffic control apparatus 110. The traffic control apparatus 110 receives a video image from the camera 120 (Step S1). In the traffic control apparatus 110, the accident detection unit 111 detects the occurrence of an accident from the video image received in Step S1 (Step S2). When the occurrence of no accident is detected, the traffic control apparatus 110 repeatedly executes Step S1 and continues receiving a video image.

When an accident is detected, the vehicle data acquisition unit 112 acquires vehicle data from the vehicle which has caused the accident (Step S3). In Step S3, the vehicle data acquisition unit 112 acquires, for example, vehicle speed data, acceleration data, and airbag operation status data. The accident situation determination unit 113 determines the accident situation based on the video image received in Step S1 and the vehicle data acquired in Step S2 (Step S4). In Step S4, the accident situation determination unit 113 determines, for example, whether or not traveling of vehicles on the road is hampered. In addition, the accident situation determination unit 113 determines whether or not the accident is an accident involving injury or death, whether or not a fire has occurred, the scale of the accident, and the injury condition. If, for example, no vehicle data has been acquired in Step S2, the accident situation determination unit 113 may determine the accident situation based on the video image received in Step S1.

The traffic light control unit 114 controls the traffic light 130 based on the accident situation determined in Step S4 (Step S5). The traffic light control unit 114 instructs the control panel 140 to turn all the traffic lights 130 at the intersection to red lights in Step S5 when it is determined that traveling of vehicles on the road is hampered. The control panel 140 controls the traffic light 130 to a red light according to the instruction. By turning the traffic light 130 to a red light, it is possible to prevent the inflow of other vehicles to the intersection where traveling of vehicles on the road is hampered and to prevent a secondary accident from occurring.

The reporting unit 116 selects the reporting destination of the occurrence of the accident based on the situation of the accident determined in Step S4 (Step S6). In Step S6, the reporting unit 116 selects the reporting destination from, for example, the police 150, the fire department 160, and the vehicle 170 according to) the situation of the accident. When it is determined that a person has been injured, for example, the reporting unit 116 selects the police 150 and the fire department 160 as the reporting destinations. The reporting unit 116 can select a vehicle 170 in the vicinity of the intersection where the accident has occurred as the reporting destination when first aid by a nearby person is required.

The parking position specifying unit 115 specifies the available parking position of the vehicle dispatched in response to the report from the video image received in Step S1 (Step S7). The parking position specifying unit 115 specifies the available parking position of a police vehicle in Step S7 when the reporting destination selected in Step S6 includes the police 150. If the reporting destination selected in Step S6 includes the fire department 160, the parking position specifying unit 115 specifies the available parking position of a fire engine or an ambulance in Step S7.

The reporting unit 116 transmits report data including the occurrence of the accident and the situation of the accident to the reporting destination selected in Step S6, and reports the occurrence of the accident to the reporting destination (Step S8). The reporting unit 116 transmits the available parking position specified in Step S7 to the reporting destination in Step S8. In addition to the report data, the reporting unit 116 may transmit the video image received from the camera 120 to the reporting destination in Step S8. Either controlling of the traffic light 130 in Step S5 and reporting in Steps S6 to S8 may be performed first, or they are performed in parallel with each other.

Figure 5:
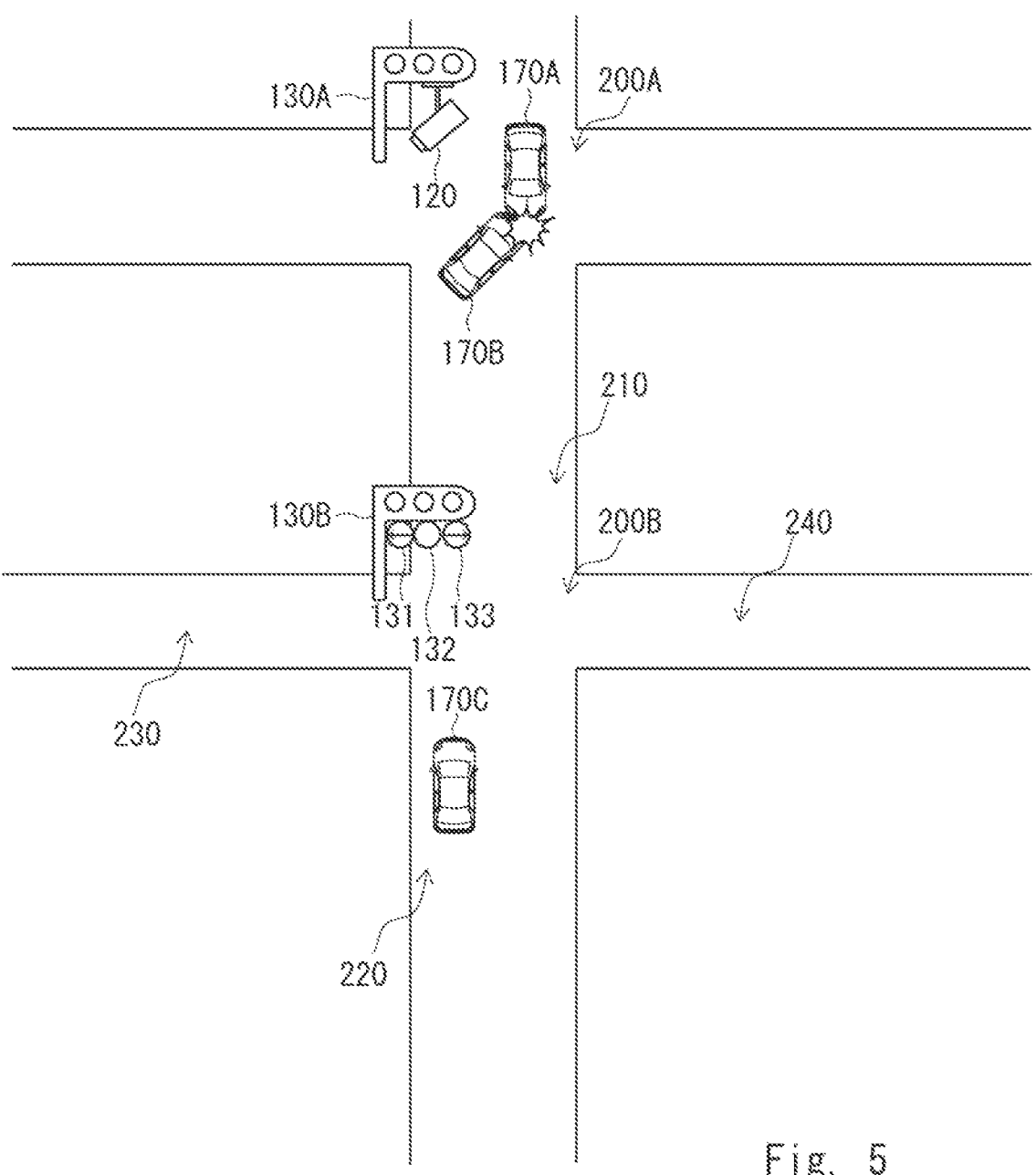
FIG. 5 is a plan view schematically showing the intersection where the accident has occurred and a near intersection therearound.

Specific examples will be described below. FIG. 5 schematically shows the intersection where the accident has occurred and an intersection therearound. Here, it is assumed that the accident has involved a vehicle 170A and a vehicle 170B at an intersection 200A. A traffic light 130A is installed at the intersection 200A, and a camera 120 is installed at the traffic light 130A. A traffic light 130B is installed at an intersection 200B which is an intersection near the intersection 200A. Traffic light 130B has a turn-left signal 131, a go-straight signal 132, and a turn-right signal 133 in addition to red, yellow, and green lights. It is assumed that there are four roads through which vehicles and the like can flow out of the intersection 200B: roads 210, 220, 230, and 240. Of these roads, the road 210 is the road leading to the intersection 200A. Although not shown in FIG. 5, another camera 120 may also be installed in the traffic light 130B.

The accident detection unit 111 (see FIG. 3) of the traffic control apparatus 110 detects the vehicle 170A, the vehicle 170B, and the accident at the intersection 200A from the video image captured by the camera 120. The vehicle data acquisition unit 112 acquires vehicle data including vehicle speed data, acceleration data, and airbag operation status data from each of the vehicle 170A and the vehicle 170B. If the vehicle 170A and the vehicle 170B are not equipped with an on-board device capable of transmitting vehicle data to the traffic control apparatus 110, acquisition of vehicle data is omitted.

An accident situation determination unit 113 determines the situation of an accident based on the video image captured by the camera 120. The accident situation determination unit 113 determines, for example, whether or not traveling of vehicles on the road flowing into the intersection 200A and the intersection 200A is hampered. The accident situation determination unit 113 determines, for example, that traveling of vehicles on the road is hampered at the intersection 200A when the vehicle 170A and the vehicle 170B block the lane. The accident situation determination unit 113 determines that traveling of vehicles on the road is hampered at the intersection 200A when debris of the vehicle 170A and the vehicle 170B are scattered on the road or when the luggage is scattered on the road due to the accident. When it is determined that traveling of vehicles on the road is hampered through the intersection 200A, the traffic light control unit 114 turns the traffic light 130A to a red light. In this case, the inflow of vehicles to the intersection 200A where the accident has occurred can be prevented. The red light is lifted after confirmation of safety, for example, by a police officer arriving at the scene.

In addition to the traffic light 130A installed at the intersection 200A, the traffic light control unit 114 controls the traffic light 130B installed at the adjacent intersection 200B. The traffic light control unit 114 controls the traffic light 130B so that vehicles entering the intersection 200B do not flow out through the road 210. For example, the traffic light control unit 114 turns on the turn-left signal 131 and the turn-right signal 133 and turns off the go-straight signal 132 at the traffic light 130B. In this case, a vehicle 170C entering the intersection 200B from a road 220 cannot go straight through the intersection 200B toward the road 210 and turns left at the intersection 200B toward a road 230. Alternatively, the vehicle 170C turns right at the intersection 200B toward the road 240. At other intersections adjacent to the intersection 200A, not shown in FIG. 5, the traffic lights are similarly controlled so that flow to the road leading to the intersection 200A is prevented. In this manner, a vehicle passing intersections therearound can bypass the intersection 200A where the accident has occurred.

The accident situation determination unit 113 also determines whether or not the accident is has caused an injury or a death of a person, whether or not a fire has occurred due to the accident, the scale of the accident, and the condition of the injured person based on the video image captured by the camera 120 and the acquired vehicle data. The accident situation determination unit 113 determines, for example, whether a passenger of the vehicle is bleeding, moving, or lying on the road from the video image captured by the camera 120. The accident situation determination unit 113 may determine, based on the video image captured by the camera 120, whether or not there is a pedestrian involved in the accident at the intersection 200A. The accident situation determination unit 113 may determine that the scale of the accident is large when, for example, the accident involves a plurality of vehicles or the like. The reporting unit 116 selects a reporting destination according to the determined situation of the accident, and reports the occurrence of the accident and the situation of the accident to the selected reporting destination.

For example, when the accident has caused an injury or a death of a person, the reporting unit 116 selects both the police 150 (see FIG. 2) and the fire department 160 as reporting destinations. The reporting unit 116 notifies the police 150 of the occurrence of the accident involving injury or death. The reporting unit 116 also requests the fire department 160 to transport the injured person. In addition to the police 150 and the fire department 160, the reporting unit 116 may select a vehicle 170 traveling around the intersection 200A as a reporting destination. For example, if there is a person lying on the road, the reporting unit 116 may notify a vehicle 170 traveling around the intersection 200A that there is a person lying on the road and request rescue for the lying person.

The parking position specifying unit 115 identifies the width of the road and the width of the shoulder of the road from the video image captured by the camera 120. The parking position specifying unit 115 determines whether or not there is a space where a vehicle can stop, and specifies an available parking position at and around the intersection 200A. The reporting unit 116 notifies the selected reporting destination of the available parking position specified by the parking position specifying unit 115. In this case, the vehicle rushing to the intersection 200A upon receiving the notification can be smoothly parked at the notified available parking position.

In this example embodiment, the accident situation determination unit 113 determines the accident situation based on the video image received from the camera 120. The traffic light control unit 114 controls the lighting of the traffic light 130 according to the accident situation. By controlling the lighting of the traffic light 130, the traffic light control unit 114 can control the traffic at the intersection according to the accident situation. For example, the traffic light control unit 114 turns the traffic light 130 to a red light when it is determined that traveling of vehicles on the road is hampered. In this case, the traffic control apparatus 110 can prevent vehicles from entering the intersection where traveling of vehicles on the road is hampered. In this example embodiment, the secondary accident can be prevented by preventing the vehicle from going to the intersection where the accident is detected.

In addition, when it is determined that traveling of vehicles on the road is hampered, the traffic light control unit 114 controls the traffic light 130 at the intersection around the intersection where the accident is detected to prevent vehicles from flowing from the surrounding intersection into the intersection where the accident is detected. In this case, the traffic control apparatus 110 can force vehicles traveling near the nearby intersection to bypass the intersection where the accident is detected. It is considered that when it is determined that the accident impedes the travelling of vehicles and the like on the road, and then the traffic light 130 at the intersection where the accident is detected is turned to a red light, a traffic jam may occur at the intersection. Such occurrence of a traffic jam can be prevented by forcing vehicles traveling the nearby intersection to bypass the intersection where the accident is detected.

Furthermore, in this example embodiment, the reporting unit 116 notifies the reporting destination of the occurrence of the accident according to the determined situation of the accident. For example, when there is or is likely to be an injured person, not only the police 150 but also the fire department 160 are notified of the occurrence of the accident, so that the rescue of the injured person can be carried out promptly. In addition, when immediate treatment is necessary at the scene, it is possible to notify a vehicle traveling near the intersection where the accident has been detected about the occurrence of the accident, and request the first aid for the injured person.

Figure 6:
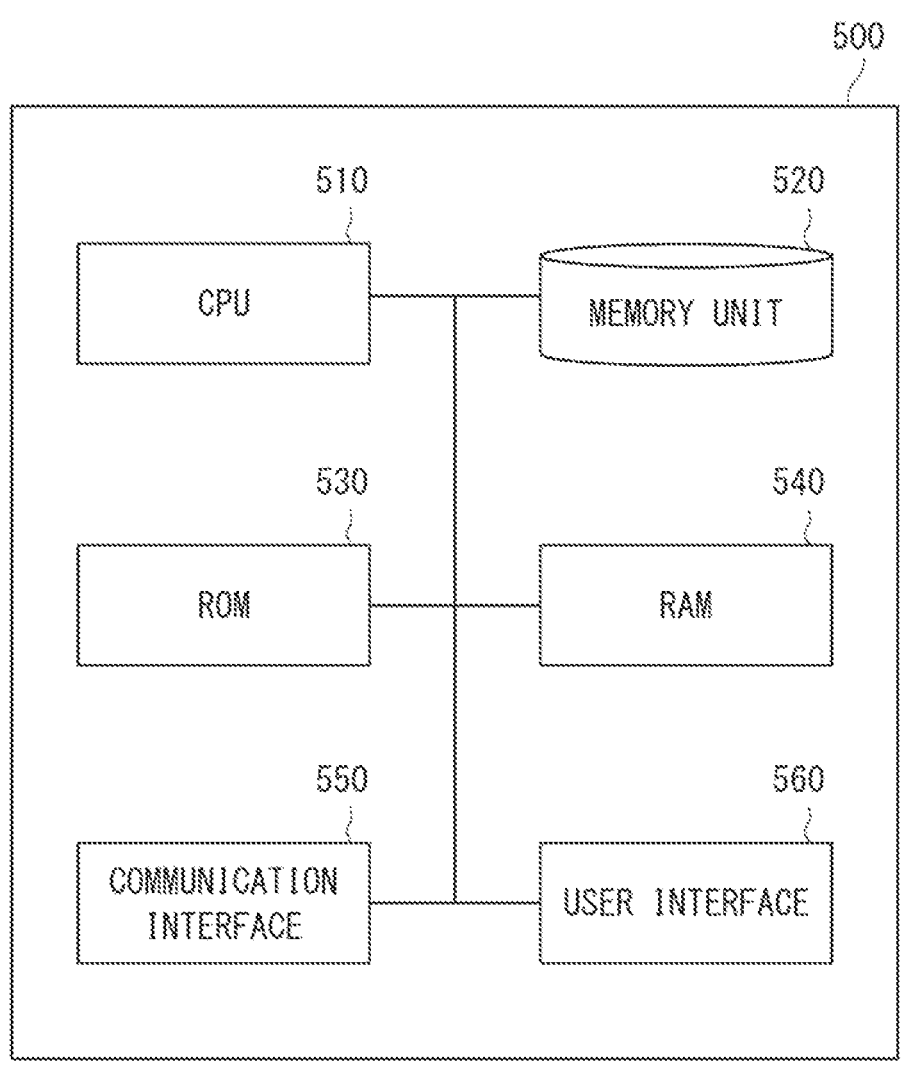
FIG. 6 is a block diagram illustrating an example configuration of a computer device.

Next, an example of the hardware configuration of the traffic control apparatus 110 will be described. FIG. 6 shows an example of a configuration of a computer device that can be used as the traffic control apparatus 110. A computer device 500 includes a central processing unit (CPU: Central Processing Unit) 510, a storage unit 520, a read only memory (ROM: Read Only Memory) 530, a random access memory (RAM: Random Access Memory) 540, a communication interface (IF: Interface) 550, and a user interface 560.

The communication interface 550 is an interface for connecting the computer device 500 to a communication network via wired communication means, wireless communication means, or the like. The user interface 560 includes a display unit such as a display. The user interface 560 also includes an input unit such as a keyboard, a mouse, and a touch panel.

The storage unit 520 is an auxiliary storage device capable of holding various kinds of data. The storage unit 520 is not necessarily a part of the computer device 500, and may be an external storage device or cloud storage connected to the computer device 500 via a network.

The ROM 530 is a nonvolatile storage device. For the ROM 530, a semiconductor storage device such as a flash memory having a relatively small capacity is used. The program executed by the CPU 510 may be stored in the storage unit 520 or the ROM 530. The storage unit 520 or the ROM 530 stores, for example, various programs for executing the functions of each part of the traffic control apparatus 110.

The program includes a group of instructions (or software code) for causing the computer to perform one or more functions described in the example embodiment when the program is read into the computer. The program may be stored in a non-temporary computer readable medium or a tangible storage medium. By way of example, but not limitation, a computer readable medium or a physical storage medium may include RAM, ROM, flash memory, solid-state drive (SSD) or other memory technology, compact disk (CD) ROM, digital versatile disc (DVD), Blu-ray disc (Registered trademark) or other optical disc storage, magnetic cassette, magnetic tape, magnetic disc storage or other magnetic storage device. The program may be transmitted on a temporary computer readable medium or communication medium. By way of example, but not limitation, a temporary computer readable medium or communication medium includes an electrical, optical, acoustic or other form of communication signal.

The RAM 540 is a volatile storage device. Various semiconductor memory devices such as DRAM (Dynamic Random Access Memory) or SRAM (Static Random Access Memory) are used for the RAM 540. The RAM 540 can be used as an internal buffer for temporarily storing data, etc. The CPU 510 loads programs stored in the storage unit 520 or the ROM 530 to the RAM 540 and executes them. When the CPU 510 executes programs, functions of each part in traffic control apparatus 110 can be performed. The CPU 510 may have an internal buffer that can temporarily store data, etc.

Although the example embodiments of the present disclosure have been described in detail above, the present disclosure is not limited to the example embodiments mentioned above, but also includes changes or modifications to the example embodiments mentioned above to the extent that they do not deviate from the purpose of the present disclosure.

For example, some or all of the above example embodiments may also be described as, but are not limited to, the following.

Supplementary Note 1

A traffic control apparatus including:

detection means for detecting an occurrence of an accident from a video image captured by an imaging device capable of capturing a video image of a road on which a moving object travels;

determination means for determining a situation of the accident based on the video image; and traffic light control means for controlling a first traffic light installed at a first intersection where the accident has occurred based on the situation of the accident.

Supplementary Note 2

The traffic control apparatus described in Supplementary Note 1, wherein the determination means determines whether or not traveling of vehicles on a road is hampered due to the accident, and the traffic light control means controls a light of the first traffic light to a light indicating that traffic is not allowed when it is determined that traveling of vehicles on the road is hampered.

Supplementary Note 3

The traffic control apparatus described in Supplementary Note 2, wherein the traffic light control means further controls at least one second traffic light installed at least one second intersection from which a road leads to the road where the accident has occurred when it is determined that traveling of vehicles on the road is hampered.

Supplementary Note 4

The traffic control apparatus described in Supplementary Note 3, wherein the traffic light control means controls a light of the second traffic light to prevent traffic from flowing to a road leading to the first intersection among a plurality of roads through which vehicles can flow out of the second intersection.

Supplementary Note 5

The traffic control apparatus described in any one of Supplementary Notes 2 to 4, wherein the determination means determines that traveling of vehicles on the road is hampered when the moving object which has caused the accident blocks a lane and/or when debris is scattered on the road due to the accident.

Supplementary Note 6

The traffic control apparatus described in any one of Supplementary Notes 1 to 5, further including reporting means for selecting a reporting destination according to the situation of the accident and reporting the occurrence of the accident to the selected reporting destination.

Supplementary Note 7

The traffic control apparatus described in Supplementary Note 6, wherein the determination means determines as the situation of the accident at least one of whether or not the accident has caused an injury or a death of a person, whether or not a fire has occurred due to the accident, a scale of the accident, or a condition of an injured person, and the reporting means selects the reporting destination according to at least one of whether or not the accident has caused an injury or a death of a person, whether or not a fire has occurred due to the accident, a scale of the accident, or a condition of an injured person.

Supplementary Note 8

The traffic control apparatus described in Supplementary Note 7, further including parking position specifying means for specifying an available parking position for a vehicle dispatched upon receiving a notification of an occurrence of the accident based on the video image when the occurrence of the accident has been detected, wherein the reporting means notifies the reporting destination of the specified available parking position.

Supplementary Note 9

The traffic control apparatus described in any one of Supplementary Notes 6 to 8, wherein the reporting means transmits the video image to the reporting destination.

Supplementary Note 10

The traffic control apparatus described in any one of Supplementary Notes 1 to 8, further including vehicle data acquisition means for acquiring vehicle data from the moving object which has caused the accident, wherein the determination means determines the situation of the accident based on the video image and the vehicle data.

Supplementary Note 11

A traffic control system including:

an imaging device configured to be capable of capturing a video image of a road on which a moving object travels; and a traffic control apparatus configured to receive a video image from the imaging device and control passage of the moving object traveling on the road, wherein the traffic control apparatus includes;

detection means for detecting an occurrence of an accident from the video image captured by the imaging device;

determination means for determining a situation of the accident based on the video image; and traffic light control means for controlling a first traffic light installed at a first intersection where the accident has occurred based on the situation of the accident.

Supplementary Note 12

The traffic control system described in Supplementary Note 11, wherein the determination means determines whether or not traveling of vehicles on a road is hampered due to the accident, and the traffic light control means controls a light of the first traffic light to a light indicating that traffic is not allowed when it is determined that traveling of vehicles on the road is hampered.

Supplementary Note 13

The traffic control system described in Supplementary Notes 11 or 12, wherein the traffic control apparatus further includes reporting means for selecting a reporting destination according to the situation of the accident and reporting the occurrence of the accident to the selected reporting destination.

Supplementary Note 14

A traffic control method including:

detecting an occurrence of an accident from a video image captured by an imaging device capable of capturing a video image of a road on which a moving object travels;

determining a situation of the accident based on the video image; and controlling a traffic light installed at an intersection where the accident has occurred based on the situation of the accident.

Supplementary Note 15

A non-transitory computer readable medium storing a program for causing a computer to perform processes including:

detecting an occurrence of an accident from a video image captured by an imaging device capable of capturing a video image of a road on which a moving object travels;

determining a situation of the accident based on the video image; and controlling a traffic light installed at an intersection where the accident has occurred based on the situation of the accident.

REFERENCE SIGNS LIST

10: TRAFFIC CONTROL SYSTEM
20: TRAFFIC CONTROL APPARATUS
21: DETECTION MEANS
22: DETERMINATION MEANS
23: TRAFFIC LIGHT CONTROL MEANS
30: IMAGING DEVICE
40: TRAFFIC LIGHT
100: TRAFFIC CONTROL SYSTEM
110: TRAFFIC CONTROL APPARATUS
111: ACCIDENT DETECTION UNIT
112: VEHICLE DATA ACQUISITION UNIT
113: ACCIDENT SITUATION DETERMINATION UNIT
114: TRAFFIC LIGHT CONTROL UNIT
115: PARKING POSITION SPECIFYING UNIT
116: REPORTING UNIT
120): CAMERA
130: TRAFFIC LIGHT
140: CONTROL PANEL
150: POLICE

160: FIRE DEPARTMENT
170: VEHICLE

What is claimed is:

1. A traffic control apparatus comprising:
a memory storing instructions; and
a processor configured to execute the instructions to:
detect an occurrence of an accident from a video image captured by a camera capable of capturing a video image of a road on which a moving object travels;
determine a situation of the accident based on the video image; and
control a first traffic light installed at a first intersection where the accident has occurred based on the situation of the accident;
select a reporting destination according to the situation of the accident and report the occurrence of the accident to the selected reporting destination;
specify an available parking position for a vehicle dispatched upon receiving a notification of the occurrence of the accident based on the video image in a case where the occurrence of the accident has been detected; and
notify the reporting destination of the specified available parking position.

2. The traffic control apparatus according to claim 1, wherein
the processor is configured to execute the instructions to:
determine whether or not traveling of vehicles on a road is hampered due to the accident, and
control a light of the first traffic light to a light indicating that traffic is not allowed when it is determined that traveling of vehicles on the road is hampered.

3. The traffic control apparatus according to claim 2, wherein the processor is further configured to execute the instructions to control at least one second traffic light installed at least one second intersection from which a road leads to the road where the accident has occurred when it is determined that traveling of vehicles on the road is hampered.

4. The traffic control apparatus according to claim 3, wherein the processor is configured to execute the instructions to control a light of the second traffic light to prevent traffic from flowing to a road leading to the first intersection among a plurality of roads through which vehicles can flow out of the second intersection.

5. The traffic control apparatus according to claim 2, wherein the processor is configured to execute the instructions to determine that traveling of vehicles on the road is hampered when the moving object which has caused the accident blocks a lane and/or when debris is scattered on the road due to the accident.

6. The traffic control apparatus according to claim 1, wherein
the processor is configured to execute the instructions to:
determine as the situation of the accident at least one of whether or not the accident has caused an injury or a death of a person, whether or not a fire has occurred due to the accident, a scale of the accident, or a condition of an injured person, and
select the reporting destination according to at least one of whether or not the accident has caused an injury or a death of a person, whether or not a fire has occurred due to the accident, a scale of the accident, or a condition of an injured person.

7. The traffic control apparatus according to claim 1, wherein the processor is configured to execute the instructions to transmit the video image to the reporting destination.

8. The traffic control apparatus according to claim 1, wherein the processor is further configured to execute the instructions to acquire vehicle data from the moving object which has caused the accident, and the processor is configured to execute the instructions to determine the situation of the accident based on the video image and the vehicle data.

9. A traffic control system comprising:
a camera configured to be capable of capturing a video image of a road on which a moving object travels; and
the traffic control apparatus according to claim 1.

10. The traffic control system according to claim 9, wherein
the processor is configured to execute the instructions to:
determine whether or not traveling of vehicles on a road is hampered due to the accident, and
control a light of the first traffic light to a light indicating that traffic is not allowed when it is determined that traveling of vehicles on the road is hampered.

11. A traffic control method comprising:
detecting an occurrence of an accident from a video image captured by a camera capable of capturing a video image of a road on which a moving object travels;
determining a situation of the accident based on the video image; and
controlling a traffic light installed at an intersection where the accident has occurred based on the situation of the accident;
selecting a reporting destination according to the situation of the accident and report the occurrence of the accident to the selected reporting destination;
specifying an available parking position for a vehicle dispatched upon receiving a notification of the occurrence of the accident based on the video image in a case where the occurrence of the accident has been detected; and
notifying the reporting destination of the specified available parking position.

12. A non-transitory computer readable medium storing a program for causing a computer to perform processes comprising:
detecting an occurrence of an accident from a video image captured by a camera capable of capturing a video image of a road on which a moving object travels;
determining a situation of the accident based on the video image; and
controlling a traffic light installed at an intersection where the accident has occurred based on the situation of the accident;
selecting a reporting destination according to the situation of the accident and report the occurrence of the accident to the selected reporting destination;
specifying an available parking position for a vehicle dispatched upon receiving a notification of the occurrence of the accident based on the video image in a case where the occurrence of the accident has been detected; and
notifying the reporting destination of the specified available parking position.

* * * * *